US007883927B2

(12) United States Patent
Subramanian

(10) Patent No.: US 7,883,927 B2
(45) Date of Patent: Feb. 8, 2011

(54) METHOD AND APPARATUS TO SORT NANOTUBES

(75) Inventor: Krupakar M. Subramanian, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 828 days.

(21) Appl. No.: 11/217,095

(22) Filed: Aug. 31, 2005

(65) Prior Publication Data
US 2007/0046164 A1    Mar. 1, 2007

(51) Int. Cl.
*H01L 21/00* (2006.01)
*H01L 21/31* (2006.01)
*H01L 21/469* (2006.01)

(52) U.S. Cl. .......................... 438/82; 438/780
(58) Field of Classification Search ............ 438/82, 438/780
See application file for complete search history.

(56) References Cited

U.S. PATENT DOCUMENTS

| 6,723,299 | B1 * | 4/2004 | Chen et al. ............... | 423/447.1 |
| 6,777,880 | B2 * | 8/2004 | Morfill et al. ........... | 315/111.21 |
| 2006/0275549 | A1 * | 12/2006 | Subramanian et al. ...... | 427/282 |
| 2006/0284162 | A1 * | 12/2006 | Kurt et al. ............. | 257/14 |

OTHER PUBLICATIONS

"Dusty Plasmas", http://dusty.physics.uiowa.edu/, Department of Physics and Astronomy, The University of Iowa. No date is listed for web site. The latest reference to a date is 2001 (link to 9th Workshop on the Physics of Dusty Plasmas),(No date listed),1-2.

Bandow, S. , et al., "Purification of single-wall carbon nanotubes by microfiltration", *Journal of Physical Chemistry B*, 101(44), (Oct. 30, 1997),8839-42.

Bouchoule, Andre , *Dusty plasmas : physics, chemistry, and technological impacts in plasma processing*, John Wiley & Sons,(1999),Chapter 4.

Ebbesen, T. W., et al., "Purification of nanotubes", *Nature*, 367, (Feb. 10, 1994),519-519.

Harris, Peter J., *Carbon nanotubes and related structures : new materials for the twenty-first century*, Cambridge, UK ; New York : Cambridge University Press,(1999),49.

Harris, Peter J., *Carbon nanotubes and related structures : new materials for the twenty-first century*, Cambridge, UK ; New York : Cambridge,(1999),Chapter 5, 29 pgs.

Hegazi, Emad , et al., "Varactor Characteristics, Oscillator Tuning Curves, and AM-FM Conversion", *IEEE Journal of Solid-State Circuits*, 38(6), (Jun. 2003),1033-1039.

(Continued)

*Primary Examiner*—Charles D Garber
*Assistant Examiner*—Stanetta D Isaac
(74) *Attorney, Agent, or Firm*—Schwegman, Lundberg & Woessner, P.A.

(57) ABSTRACT

Methods and systems for sorting nanostructures, such as nanodot or nanotubes, are described. The sorting of the nanostructures removes remnants of the nanotube fabrication from the mixture or bundle of material. The sorting includes suspending the mixture in a plasma, which separated the nanostructures and remnant material. A motive force, such as gas flow or laser, is applied to the suspended nanostructures and remnants such that the larger material moves out of the plasma while the smaller material remains trapped in the plasma.

25 Claims, 6 Drawing Sheets

OTHER PUBLICATIONS

Ikazaki, F., et al., "Chemical Purification of Carbon Nanotubes by Use of Graphite Intercalation Compounds", *Carbon*, 32, (1994),1539-1542.

Konopka, U., et al., "Rigid and differential plasma crystal rotation induced by magnetic fields", *Physical Review E (Statistical Physics, Plasmas, Fluids, and Related Interdisciplinary Topics)*, 61(2), (Feb. 2000),1890-8.

Shelimov, K. B., et al., "Purification of single-wall carbon nanotubes by ultrasonically assisted filtration", *Chemical Physics Letters*, 282(5-6), (Jan. 23, 1998),429-34.

* cited by examiner

US 7,883,927 B2

METHOD AND APPARATUS TO SORT NANOTUBES

FIELD OF THE INVENTION

This invention pertains to nanotube fabrication, and more particularly to fabrication systems and methods.

BACKGROUND OF THE INVENTION

Nanotubes are cylindrical structures that have a diameter of about five to about 300 nanometers and exhibit unique properties. The principal type of nanotube is the carbon nanotube. Since carbon nanotubes were discovered in NEC Laboratories in 1991, the pace of research into the intriguing properties of carbon nanotubes has accelerated. Some of the proposed intriguing applications of carbon nanotubes include field emitters of flat panel displays, memory devices, transistors, mechanical reinforcing elements, and biomedical applications. While nanotubes have promising properties, there is a significant impediment to their use in commercial applications. Namely, the current techniques for fabricating nanotubes result in batches of nanotubes that do not have uniform properties and include other undesirable materials, such as carbonaceous materials. Other techniques take too long for their use in industry. Accordingly, the nanotubes must be sorted to have uniform properties for use in an application. That is, if the application is for an integrated circuit, the nanotubes must be sorted according to their electrical properties and physical dimensions, so that the nanotubes fit the design parameters. However current techniques for nanotube sorting do not provide the yields based on either time or quantity. Accordingly, there is a need for improved nanotube and nanostructure sorting

SUMMARY OF THE INVENTION

The present invention includes methods and systems for nanostructure, such as nanotube, sorting. Other nanostructures include, nut are not limited to nanocrystals and nanoparticles. One method includes providing a bundle of nanotubes, suspending the nanotubes in a plasma, and sorting the nanotubes. The bundle of nanotubes, in an embodiment, are a plurality of single walled carbon nanotubes. Sorting the nanotubes includes applying a gas flow to the suspended nanotubes. Sorting the nanotubes includes lazing the suspended nanotube, in an embodiment. Fabricating the bundle of nanostructures includes using an electric arc technique, in an embodiment. The sorted nanotubes can be used to fabricate components of an integrated circuit.

The systems include a chamber to receive a bundle of nanotubes, which, in an embodiment, includes other remnant material. A plasma source is positioned to create a plasma in the chamber to suspend the bundle of raw nanotubes. A motive force to selectively move one group of nanotubes, having a certain size, is provided. The motive force moves a group of larger nanotubes from the smaller nanotubes. The smaller nanotubes will be preferentially left behind stuck in the plasma sheath. In an embodiment, the motive source is a gas flow. In an embodiment, the motive force includes a laser system.

These and other aspects, embodiments, advantages, and features will become apparent from the following description and the referenced drawings.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The terms wafer and substrate used in the following description include any base semiconductor structure. Both are to be understood as including silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. The following detailed description is, therefore, not to be taken in a limiting sense, and the scope of the present invention is defined by the appended claims.

Figure 1:
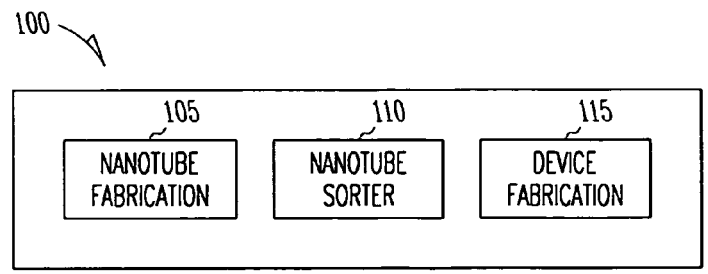
FIG. 1 is a block diagram of a system in accordance with an embodiment of the present invention.

FIG. 1 shows a nanotube sorting system 100 having a nanotube fabrication 105, a nanotube sorter 110, and device fabrication 115. The fabrication 105 is an apparatus that grows nanotubes. The nanotubes are formed in a mixture with other nano-structures, such as nanodots and nano-spheres. The mixture further includes remnants of the fabrication such as carbon and other elements that cling to the nan-structures. The fabrication 105 will be described in greater detail herein. The sorter 110 is an apparatus that takes a mixture of nano-structures and remnants of the fabrication process and removes the remnants, i.e., contaminants. Sorter 110 further operates to sort the nanostructures, in particular nanotubes, by their size. Accordingly, the sorter 110 provides generally uniform sized nano-structures, such as nanotubes having generally the same length, to the device fabrication 115. In an embodiment, the sorter 110 provides nanotubes having a similar length, for example, within about 15% of each other. In an embodiment, the sorter provides nanotubes within about a range of +/−10%. In an embodiment, the sorter provides nanotubes within about a range of +/−5%. The sorter 110 will be described in greater detail herein, for example, in conjunction with FIGS. 4, 6, and 7. Device fabrication 115 takes the sorted nano-structures from the sorter and builds structures such an integrated circuits or microelectromechanical systems. Device fabrication 115 will be described in greater detail, for example, in conjunction with FIG. 4.

Figure 2:
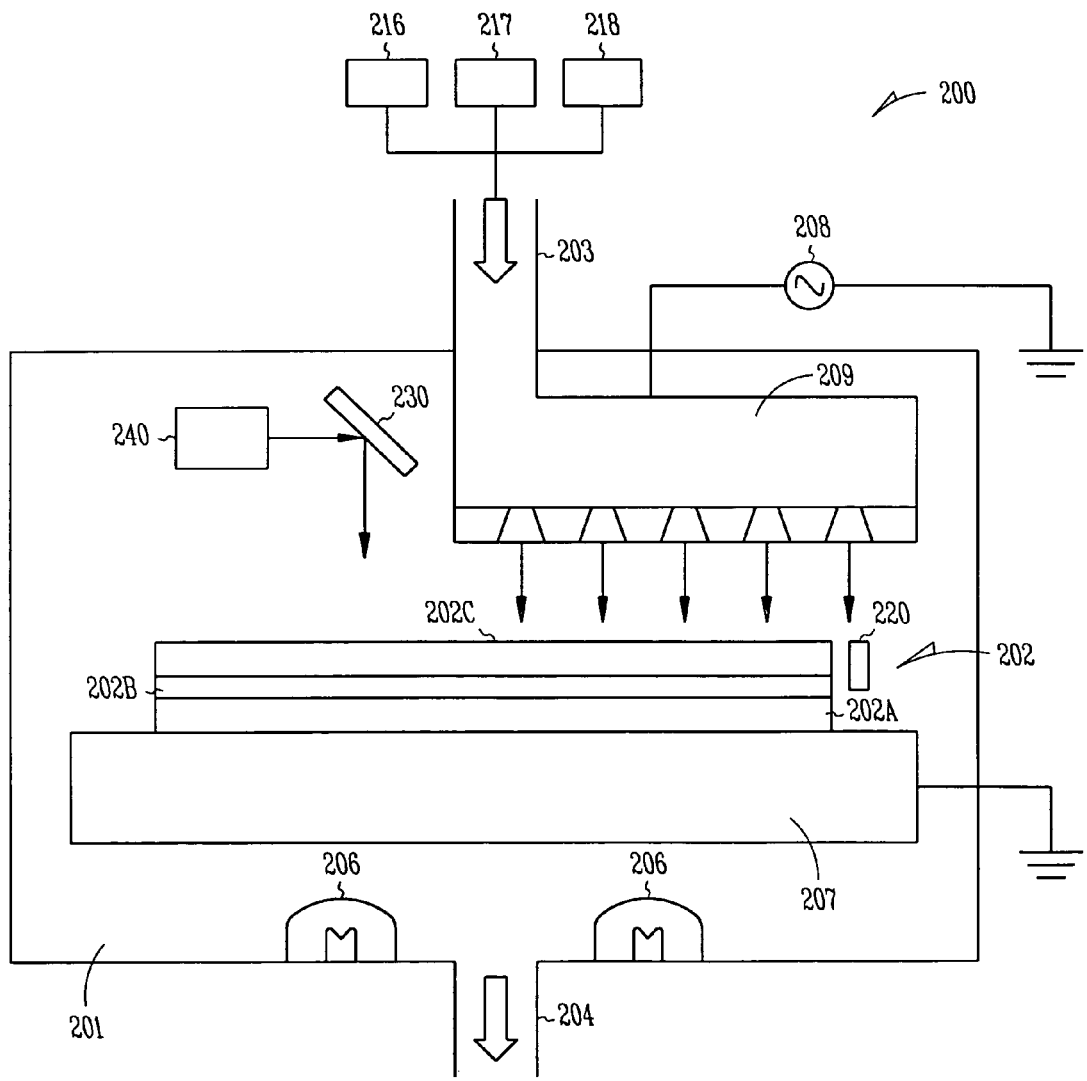
FIG. 2 is a block diagram of a nanotube fabrication in accordance with an embodiment of the present invention.

Nanotube fabrication 105 as shown in FIG. 2 includes a nanotube fabrication reactor 200 suitable for practicing the present invention. FIG. 2 is provided for illustrative purposes and the invention may be practiced with other reactors and structures as required to fabricate nanotubes and other nano-structures. Reactor 200 is illustrated as a single wafer reactor, but it should be understood that the invention is applicable to batch reactors. The embodiment shown in FIG. 2 includes a chamber 201 that is a pressure-sealed compartment for mounting a substrate 202 on chuck 207. It will be appreciated that chuck 207, in an embodiment, is adapted to hold a plurality of substrates. Chuck 207, in an embodiment, is an electrostatic chuck. Chamber 201 is typically manufactured from aluminum or stainless steel and is designed to contain a low-pressure environment around substrate 202 as well as to contain process gases, exhaust gases, and heat or plasma energy within chamber 201. The illustrated substrate 202 includes a substrate base 202A on which is deposited a seed layer 202B. The nanotubes are grown on the seed layer 202B and 202C. Layer 202C on top of seed layer 202B represents fabricated nanotubes. A seed layer include nickel in an embodiment. Other seed layers include cobalt and/or iron. Inlet gas manifold 203 supplies process gases, for example, precursor gases and purge gases, at controlled flow rates to substrate 202. Inlet gas manifold 203 includes a diffuser 209 that spreads the inlet gas across the surface of the substrate(s). A first gas source 216 is connected to manifold 203. A second gas source 217 is connected to manifold 203. A third gas source 218 is also connected to manifold 203. Carrier gases, such as helium, argon or nitrogen, may also be supplied in conjunction with the gases supplied by the manifold as is known and understood by one of ordinary skill in the art, to control the flow rates, delivery, and saturation of elements near the substrate. Chamber 201 also incorporates a pumping system (not shown) for exhausting spent gases from chamber 201 through exhaust port 204.

Reactor 200 includes means for supplying energy to the reactable constituents or compounds in the process gases in chamber 201 on the surface of the substrate 202. The supplied energy causes the reactable constituents to react or decompose and deposit a thin seed film 202B onto the upper surface of substrate layer 202A. In one embodiment, the supplied energy includes thermal energy supplied by heat lamps 206. Heat lamps 206 heat the substrate and/or gases and/or chamber 201 according to the teachings of the present invention. In the illustrated example, lamps 206 are positioned in the base of chamber 201. Heat lamps 206 emit a significant amount of near-infra red radiation that passes through susceptor 207 to heat substrate 202. Alternatively, susceptor 207 is heated by heat lamps 206. The substrate 202 is heated by conduction from susceptor 207. The heat lamps 206 may be placed at alternate locations according to the parameters of the specific nanotube fabrication process being performed according to the present invention. Supplying heat to the chamber 201 is important as forming nanotubes, and, in particular, single walled carbon nanotubes is a high temperature dependent process. The heat sources as described herein are adapted to raise the temperature of the chamber up to 700 deg. C. High temperatures typically assist in creating well ordered nanotubes. It is within the scope to grow nanotubes and nanostructures at temperatures of about 450 deg. C.

Another embodiment supplies reaction energy by a radio frequency (RF) generator 208 as shown in FIG. 2. RF generator 208 creates a RF field between substrate 202 and an anode. In the embodiment shown in FIG. 2, susceptor 207 is grounded while the RF signal is applied to a process gas manifold 209. Alternative and equivalent reactor designs will be understood by reading the present disclosure. The RF generator 208 may create a plasma in the chamber to assist in the formation of nanotubes. An RF anode may be provided separately (not shown) and process gas manifold 209 may be electrically isolated from the RF supply. For example, the RF signal is applied to susceptor 207 and process gas manifold 209 is grounded. The RF generator 208 is adapted to produce sufficient energy to create a plasma within the chamber 201 in accordance with the present invention.

Chamber 201 includes a scraper 220 that is adapted to scrape the nanostructure layer 202C and other remnant materials from the surface of substrate 202. The scraper 220 may further scrape the seed layer 202B from the substrate 202. The scraper 220 delivers a mass of nanotubes, reaction remnants on seed layer for further processing. In order to use the nanotubes in subsequent fabrication, the nanotubes must be separated from the remnants and sorted by size.

In general, the energy sources 206 and 208 are intended to provide sufficient reaction energy in a region near the surface of substrate 202 to cause decomposition and/or reaction of the constituents of the present gas to deposit a seed layer 202B, if not already present. Moreover, energy sources 206 and 208 provide energy to grow nanotube or nanodots on seed layer 202B. One of ordinary skill in the art will understand upon reading the disclosure that any one, combination, or equivalent of the above can be employed to provide the necessary reaction energy.

Reactor 200 includes a material source 230 that provides deposition material. An energy source 240 is positioned to impart energy to the material source 230. This energy removes material from the source 230. The material is deposited on the substrate 202. The material source 230 and energy source 240 may be a physical deposition system, such as a sputtering system.

Furthermore, reactor 200 includes associated control apparatus (not shown) for detecting, measuring and controlling process conditions within reactor 200. Associated control apparatus include, as examples, temperature sensors, pressure transducers, flow meters, control valves, and control systems. Control systems include computational units such as programmable logic controls, computers and processors. Associated control apparatus further include other devices suitable for the detection, measurement and control of the various process conditions described herein.

Figure 3:
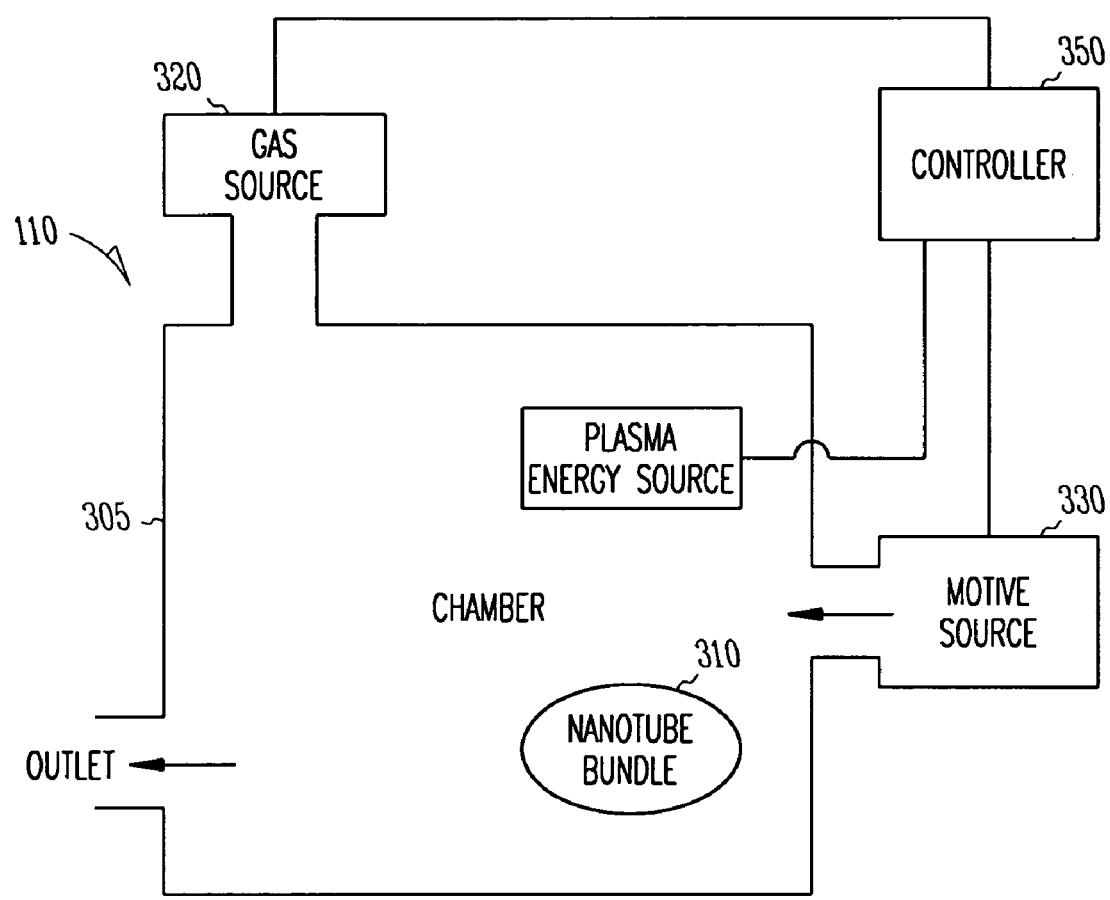
FIG. 3 is a block diagram of a nanotube sorter in accordance with an embodiment of the present invention.

Nanotube sorter 110 as shown in FIG. 3 includes a chamber 305 adapted to hold a mixture 310 of nano-structures such as nanotubes and nano-spheres and other particulate matter remaining after fabrication, e.g., remnants. In an embodiment, the nanotubes are approximately 5% to 20% by volume of the mixture. In an embodiment, nanotubes are greater than 20% by volume of the mixture. In a further, embodiment, nanotubes are about 70% by volume of the mixture. The remaining fractions include nano-spheres and other remnants. A plasma source 315 is connected to the chamber 305.

Plasma source 315 creates a plasma in the chamber in which the mixture 310 is placed. The plasma separates the fraction of nanotubes from the other portions\fractions of the mixture 310 as described herein. A gas source 320 is fluidly connected to the chamber 305. Gas source 320 injects the gas that the plasma source 315 will use to create plasma. A motive source 330 is connected to the chamber 305. Motive source 330 provided a force that moves the separated, suspended nanostructures toward outlet 340. Outlet 340 include, in an embodiment, a screen for filtering the nanostructures that exit the outlet 340. In an embodiment, the motive source 330 provides a gas flow though the chamber 305 toward the outlet 340. In an embodiment, the motive source 330 is a laser that imparts a force onto the plasma suspended nanotubes to move the nanotubes toward the outlet. A controller 350 is connected to each of the plasma source 315, gas source 320, and motive source 330. The controller 350 controls operation of each of the plasma source 315, gas source 320, and motive source 330. Controller 350 includes electronics, logic circuits, memory, hardware, and software to control operation.

Figure 4:
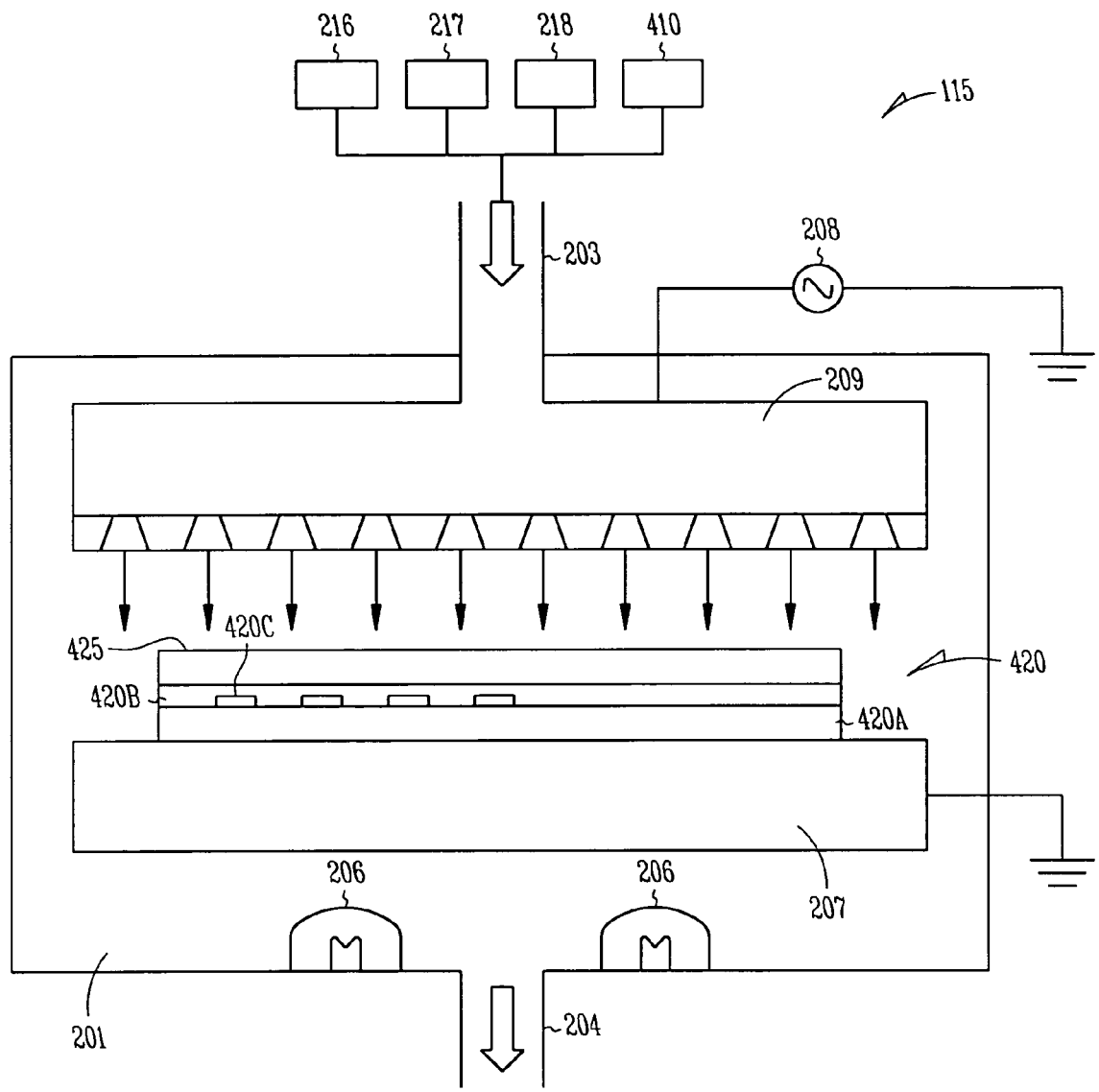
FIG. 4 is a block diagram of a device fabrication in accordance with an embodiment of the present invention.

FIG. 4 shows an embodiment of the device fabrication 115 receives the purified nanotubes from the sorter 110. Fabrication 115 orients the nanotubes, for example, using the techniques and structures described in U.S. patent application Ser. No. 11/146,248, filed Jun. 6, 2005, titled System For Controlling Placement of Nanoparticles and Method of Using Same, having the same inventor as the present application and assigned to the assignee of the present application, and hereby incorporated by reference for any purpose. In an example, fabrication 115 prepares a substrate having integrated circuit structures. The device fabrication 115 includes the essentially the same devices as discussed above with regard to FIG. 2 and the nanotube fabrication, i.e., a chamber 201, inlet gas manifold 203 with diffuser 209 that spreads the inlet gas across the surface of the substrate(s), energy sources 206, 208, and substrate support 207. A plurality of gas sources 216, 217, 218 is connected to manifold 203. Chamber 201 may also incorporate a pumping system (not shown) for exhausting spent gases from chamber 201 through exhaust port 204. Fabrication 115 further includes a nanotube supply 410, which receives purified and sorted nanotubes from the sorter 110. The nanotube supply 410 inserts the nanotubes into the chamber 201. A substrate 420 is held on the support 207. Substrate 420 includes a base 420A on which are formed layers of integrated circuit structures 420B. Layer 420B is fabricated to a point where the nanotubes are needed to complete the structure. The supply 410 inserts nanotubes into the chamber 201. A sieve 425 is positioned over the substrate 420. Sieve 425 accurately positions the nanotubes, as indicated at 420C in FIG. 4, on the substrate layer 420B. In an embodiment, the sieve is a mesh or screen. The fabrication 115 now completes the processing of the structures, such as integrated circuits, on substrate 420.

Figure 5A:
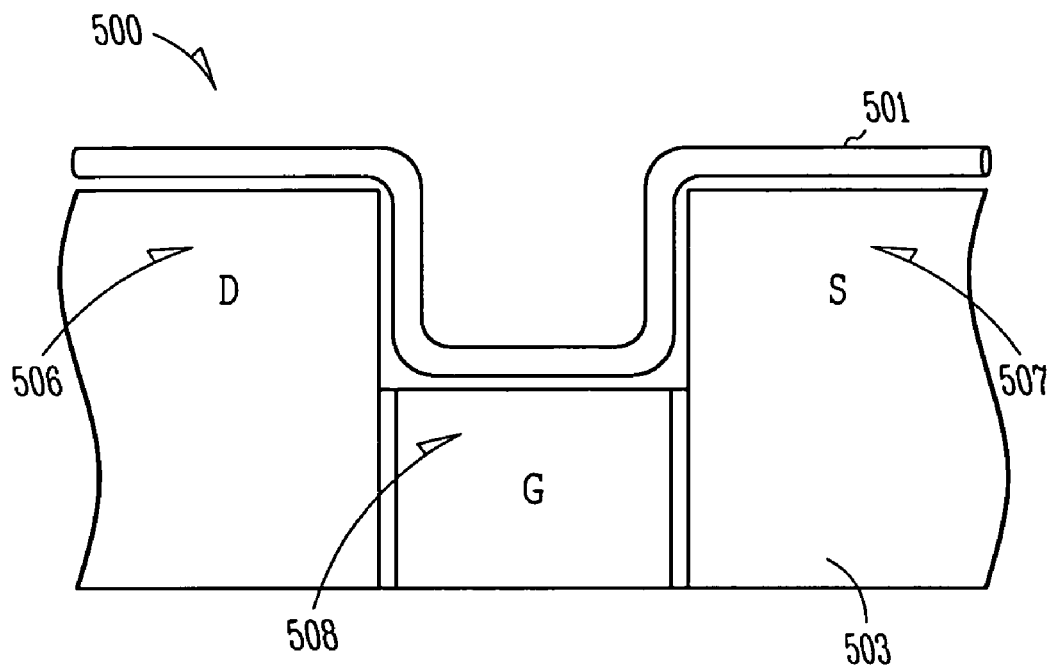
FIGS. 5A and 5B are nanotube switching devices, for example, in memory cells, in a nonconducting state (e.g., digit zero) and a conducting state (e.g., digit one), respectively.
Figure 5B:
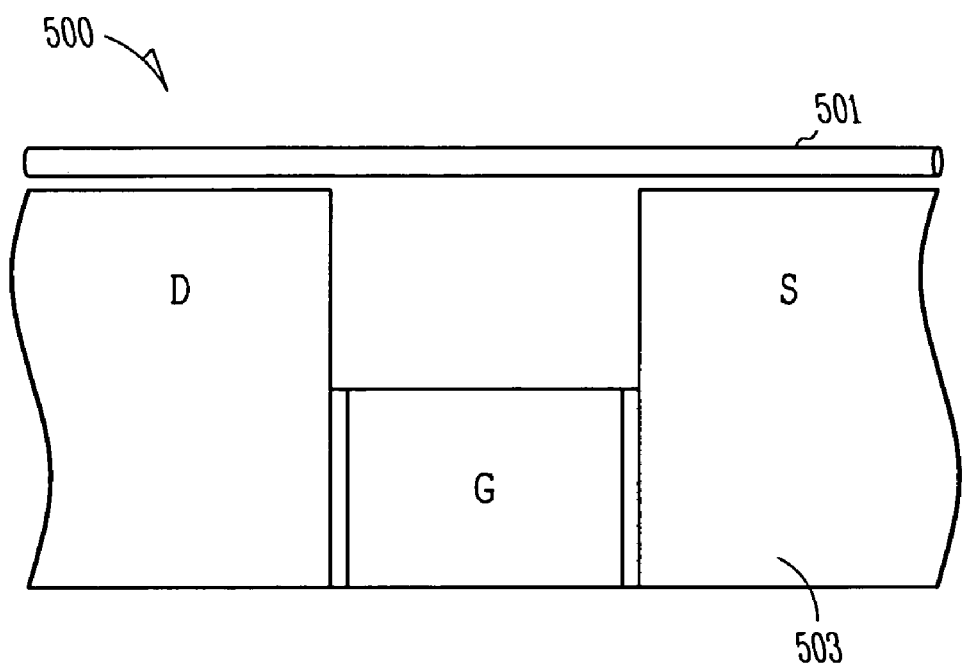

FIGS. 5A and 5B shown an embodiment of an integrated circuit 500 using a nanotube purified and sorted according to the present disclosure. A nanotube 501 has been positioned on a substrate 503. The substrate 503 includes a drain region 506, a source region 507, and a gate region 508. The drain and source regions 506, 507 are raised relative to the gate region 508. The drain and source regions 506, 507 are electrically isolated from the gate by an insulator. An example of an insulator is $SiO_2$, however, the disclosure is not limited to $SiO_2$ and could use other insulators known in the integrated circuit fabrication arts. The drain, source and gate regions each have contacts to electrically connect these regions to other circuit structures. The nanotube 501 has a length at least corresponding to the drain to source length over the gate region 508. Nanotube 501 has been sorted so that its ends respectively contact the drain region 506 and source region 507. The integrated circuit 500 is a switching device. More specifically, IC 500 has an on state shown in FIG. 5A. The nanotube 501 always conducts between drain and source regions 506, 507. In FIG. 5A, the source and drain regions are also in electrical connection with the gate region 508. IC 500 has an off state shown in FIG. 5B. Here the nanotube 501 is not in contact with gate region 508. Accordingly, a signal from either the drain or source region 506, 507 is not in electrical communication with the gate region 508. This is but one example of the devices that can be fabricated from cleaned and sorted nanotubes according to the present disclosure. The invention is not limited to this one example.

Figure 6:
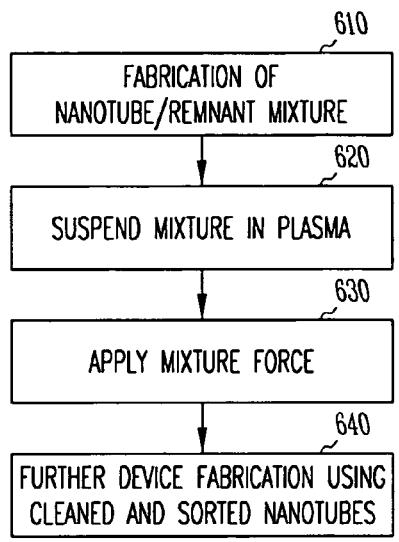
FIG. 6 is a flow chart of a process in accordance with an embodiment of the present invention.

FIG. 6 shows a flow chart of a process 600 according to an embodiment of the present invention. Nanostructures are formed in a dusty plasma, 610. Dusty plasma is sometimes referred to as a "complex" plasma. Dusty plasma are an electron-ion plasma with an additional charged component of small micron-sized particles. These extra components increase the complexity of the system even further. In the manufacture of carbon nanotubes, the extra components are typically carbon material, sometimes referred to as soot. Step 610 includes, in an embodiment, carbon arc discharging. The carbon arc discharging produces a mixture of components and requires separating nanotubes from the soot and the catalytic metals present in the crude product. This method creates nanotubes through arc-vaporization of two carbon rod electrodes placed end to end. The rods are placed close together, e.g., less than 5 mm apart. In an embodiment, the rods are spaced approximately 1 mm apart. The chamber is filled with an inert gas. Examples of gases include helium and argon. The chamber is held at a low pressure, i.e., between about 50 and 700 mbar. A direct current of about 50 to 100 amps is driven by approximately 20 volts to create a high temperature discharge between the two electrodes. The discharge vaporizes one of the carbon rods and forms a small rod shaped deposit on the other rod. In an embodiment, the anode rod includes a small amount of metal dopant. In an embodiment, the dopant is nickel. Other examples of dopant include at least one of Fe, Co, Y or Mo. Other embodiments of step 610 include laser ablation, chemical vapor deposition (CVD) and plasma-enhanced chemical vapor deposition (PECVD). The carbon nanotubes formed by these methods usually have a diameter in the order of tens of angstroms and the length of up to several micrometers. The density of carbon nanotubes in the resulting bundle, or mixture from the nanotube fabrication is typically greater than 10%. In some methods, the density of carbon nanotubes is greater than 50%. In other examples, the density of nanotubes is greater than about 70%. When CNTs are produced by arc-evaporation, nanotubes are invariably accompanied by and stuck together with nanoparticles and other graphitic debris. These non-nanotube materials must be removed to use the nanotubes in fabrication of a device. The dusty plasma technique further suspends small particles in a crystalline format within the sheath of the plasma. The sheath of the plasma is a potential barrier that is formed due to the greater loss of electrons to the surrounding chamber walls, leaving the plasma at a slightly more positive potential with respect to the wall.

In a further embodiment, the nanostructures, such as nanotubes, are suspended using the techniques and structures described herein. The nanoparticles are essentially even distributed an then released, i.e., dropped, onto a workpiece. The workpiece is a substrate in an embodiment. The workpiece further includes other composite materials. This evenly distributes the nanoparticles on the substrate. The even distribution will improve the properties of the resulting structure, for example, structural strength.

The bulk material formed by the fabrication of nanotubes, including nanotubes, particulate material, etc. is sorted, steps 620, 630. In an embodiment, the bulk or raw fabrication material that include the nanotubes is not emmersed in a solution. Instead, the bulk material is suspended in a plasma, step 620. A motive force is applied to suspended material to separate the bulk material into is components, e.g., particulate and nanotubes, step 630. This technique relies on the fact that when two particles are charged the repulsive force of the negative charges separate the particles. The motive force contacts the suspended, separated materials in the plasma. The drag force exerted on these particles would sort the particles based on their cross-section. The motive force is a gas flow, in an embodiment. The motive force is a force exerted by lasers in an embodiment. While described in conjunction with nanotubes, it will be recognized that the present method may be used to evenly disperse metal nanodots onto a substrate.

Figure 7:
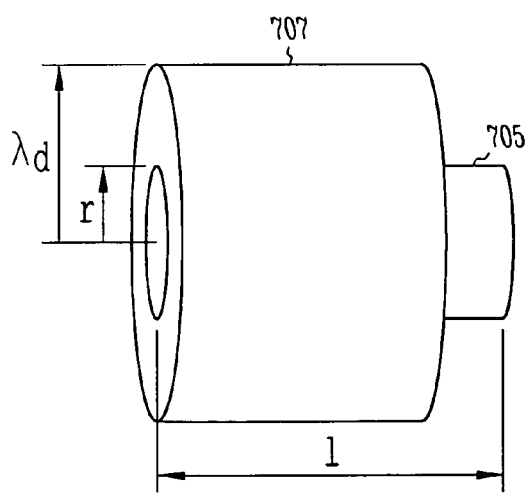
FIG. 7 is view of a nanotube surrounded by a plasma in accordance with an embodiment of the present invention.
Figure 8:
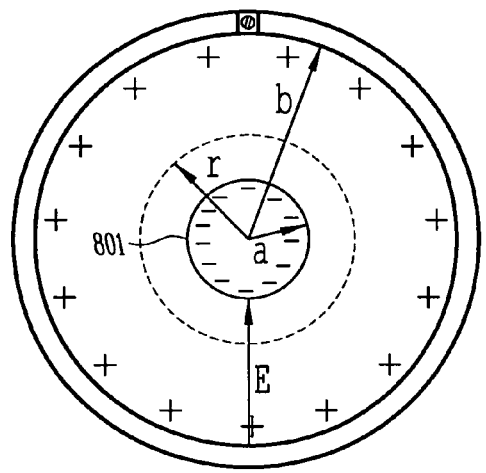
FIG. 8 is a view of two concentric cylinders with an E-filed distribution according to an embodiment of the present invention.

The sorting steps 620, 630 are believed to be based on the following principles. The capacitance of an isolated cylinder (nanotube) in plasma is governed by its geometry and the debye length of the plasma. This capacitance is derived as follows, with reference to FIGS. 7 and 8. FIG. 7 shows a cylinder 705 surrounded by plasma 707 with debye length ($\lambda_d$) in thickness. FIG. 8 shows two concentric cylinders 801, 802 with the E-field distribution. The circle with radius r is an imaginary surface. Using Gauss's Law, $$\varepsilon_o \oint E \cdot dS = Q \quad \text{[Eqn. 1]}$$

$$\varepsilon_o E 2\pi r l = Q \Rightarrow E = \frac{Q}{2\pi \varepsilon_o r l}$$

$$V = -\int_a^b E \cdot dl = \int_a^b E \cdot dr = \int_a^b \frac{Q}{2\pi \varepsilon_o l \cdot r} \cdot dr = \frac{Q}{2\pi \varepsilon_o l} \ln\left(\frac{b}{a}\right)$$

where the differential length dl is in the radial direction, and hence dl=dr, and b=$\lambda_d$ (the debye length of the plasma, see FIG. 7) and a=r, the radius of the particle. The capacitance is given by $$C = \frac{Q}{V} = \frac{2\pi \varepsilon_o l}{\ln\left(\frac{b}{a}\right)} \quad \text{[Eqn 2]}$$

Figure 9:
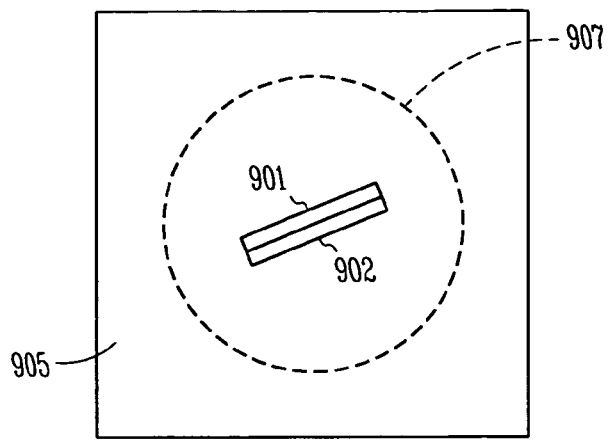
FIG. 9 is a schematic view of two nanotubes in a sheath of plasma according to an embodiment of the present invention.

Hence the total charge accumulated on a cylinder in the presence of plasma is given by:

$$Q = \frac{2\pi \varepsilon_o \cdot l \cdot V_p}{\ln\left(\frac{\lambda_d}{r_p}\right)} \quad \text{[Eqn 3]}$$

where $V_p$ is the floating potential, which is on the order of few $kT_e/q$, l is the length of the cylinder and a is the radius of the isolated cylinder. As shown in FIG. 9, nanostructures, such as nanotubes, are stuck together during fabrication, such as arc evaporation. Nanostructures such as nanotubes and nanoparticles are assumed to be of identical size and shape, with a diameter much less than the plasma Debye length. FIG. 9 shows nanostructures 901, 902 stuck together and immersed in plasma 905. The plasma sheath is shown at 907. The sticking phenomena is believed to be physical, e.g., Vanderwaal forces, with the outer surface of the particles assumed to be chemically non-reactive. It will be recognized that FIGS. 7-9 are not to scale and are shown for clarity of explanation. The sticking cohesion force depends on the size of the nanostructures. The analysis below is based on the calculations provided for spherical particles, but adapted for cylindrical particles such as carbon nanotubes. As an order of magnitude (in large excess) this force is assumed to be of the same order as the sticking force of one particle on a flat surface, without taking into account any capillary effect. The corresponding expression of this force F, is given by $$F_s \approx 1.4 \times 10^{-9} \cdot d_n (N) \quad \text{[Eqn 4]}$$

where $d_n$ is the diameter normalized to a normalization diameter $d_{po} \approx 0.1$ μm.

Electrostatic repulsive forces are typically connected only to the surface charge supported by the two nanostructures and could depend on the particle material. Plasma environment and local surface topography determines the equilibrium charge supported by nanostructures. For the sake of simplicity, the overall charge will be taken to be twice as high as the charge supported by a single particle in the same plasma (although the charge might be a little less than this value due to shadowing effect, but would not differ by an order of magnitude). The plasma-surface potential difference within the sheath is, usually, a repulsive one with an absolute value $V_s$ (from a few hundreds of $V_s$, for a cathodic surface to a few tens of $V_s$ for electrically isolated surfaces). The electric field and particle charge are functions of the particle position. A rough, overestimated, value of both parameters is obtained by using the mean value of electric field E in the sheath and the equilibrium charge $Q_p$ attached to the particle in the plasma bulk conditions. This means that the particle is lying in the sheath field but near the sheath limit. E will be expressed as $V_s/L_s$, where $V_s$ is the sheath voltage and $L_s$ is the sheath depth given by the Child-Langmuir approximation. The corresponding expression is $$\overline{E} = A(n_e)^{1/2}(T_e)^{1/4}(V_s)^{1/4} \approx 1.3 \times 10^{-4} (n_e^2 \cdot T_e \cdot V_s)^{1/4} \quad \text{[Eqn 5]}$$

where $n_e$ is in m$^{-3}$, $T_e$ is in eV, V in volts and E is in V/m. If the reduced surface potential of the particle q, at the sheath edge is expressed as $$\eta = \frac{qV_p}{kT_e}$$

and the electron charge q, then the equilibrium charge on the particle is given by:

$$Q_p = \frac{2\varepsilon_o \cdot l \cdot \eta \cdot kT_e}{q \cdot \ln\left(\frac{\lambda_d}{r_p}\right)} \quad \text{[Eqn 6]}$$

The electric force is given by $F=E \cdot Q_p$, and is expressed as:

$$F = C \cdot \eta \cdot (n_e^2 \cdot T_e^5 \cdot V_5)^{1/4} \cdot \frac{1}{\ln\left(\frac{\lambda_d}{r_p}\right)} \quad [\text{Eqn 7}]$$

where C is a constant.

This expression shows that the electric force is a smooth function of the sheath potential.

The charge distribution and polarization effects in this system depend on the nature of the particle material. As the electric field in the particle volume is reduced by partial cancellation of the anti-parallel electric fields associated with the two symmetric charge distributions, polarization effects are also reduced in this system. Assuming that the resulting repulsing force is given by an approximation between two cases of a perfect dielectric system (no charge mobility on the surface) and a metallic one (charge located at the maximum possible distance). The force between two infinitely thin (r<<I) long rods with a charge "q" uniformly distributed on its surface (not a dipole) is calculated as follows:

$$F = \frac{q^2}{4\pi\varepsilon_o} \int_{1/2}^{1/2} \frac{1}{r^2} dr = \frac{q^2}{\pi\varepsilon_o l} \quad [\text{Eqn 8}]$$

It is recognized that the above is an approximation as since the charge is never distributed uniformly across the surface of a finite rod, especially if it has a small diameter. The charge tends to accumulate on the ends of the rod where the radius of curvature is large. For the purposes of the present invention it is assumed that all the charge resides at the tip of the rods on equivalent spheres of radius equal to twice the diameter of the rod $d_p$. Each of these spheres has half the total charge on each of the rods. The force between any two spheres of charges separated by mean distance of dm is given by:

$$F = \frac{q^2}{4\pi\varepsilon_o d_m^2} \quad [\text{Eqn 9}]$$

where $q=Q_p/4$ and $d_m=d_p$ The two charges $Q_p$ are supposed to be at a mean distance of $d_p$ from each other, with a corresponding force $F_r$ (accurate within the order of magnitude) is expressed as follows:

$$F_r = \frac{Q_p^2}{64\pi\varepsilon_o d_p^2} \quad [\text{Eqn 10}]$$

The total repulsive force that the tubes experience $F_t \approx 2 \times F_r$, therefore $$\therefore F_r = \frac{Q_p^2}{32\pi\varepsilon_o d_p^2}$$

where $Q_p$ is given by Eqn 6.

The minimum condition for the two tubes to remain stuck together is: $F_r \leq F_{vw}$ (Vander Waal force) [1.12]. If this condition [1.12] is violated then the two nanostructures, e.g., carbon nanotubes separate. The amount of charge held by the particle depends on the plasma parameters such as pressure, composition and ionization source. Such parameters can be controlled externally. Hence if we suspend the nanostructures (CNT) in plasma or simply drop CNTs into a plasma and form CNT dusty plasma the tubes would naturally separate when the condition [1.12] is violated. In an embodiment, where the nanostructures are carbon nanotubes, a helium based plasma would be avoided, in an embodiment, because helium tends to be chemically activate with carbon in the case of the nanostructures being carbon nanotubes or carbon nanostructures. (it is used in the production of CNTs) In an embodiment, a helium atmosphere or plasma is present when carbon nanotubes are formed.

In step 630, a motive force is provided to move and sort the separated nanostructures suspended in the plasma. It is known that for the thinner particles ($\approx$20 nm) the gas flow effect will be reduced because the gas drag force varies as the square of the particle size, i.e., radius$\approx r_p^2$. Hence, if the gas flow within the nanostructure containing dusty plasma chamber is maintained constant then the larger particles are pushed towards outlet of chamber, typically connected to the pumping line while the smaller dust particles remain trapped within the plasma sheath. In this way smaller nanostructures are sorted from larger nanostructures. Once the separation of the larger nanostructures from the smaller nanostructures is complete, the remaining smaller nanostructures self assemble in a regular pattern within the plasma sheath that may be manipulated for other applications. If this process is repeated further sorting of nanostructures is possible.

Figure 10:
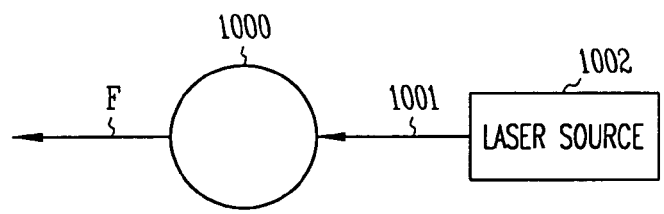
FIG. 10 is a view of a laser system imparting motive force on a nano-structure according to an embodiment of the present invention.

Another way to push the nanostructures 1000 in the dusty plasma is by using laser beams 1001 from laser source 1002 as shown in FIG. 10. The force is once again proportional to the square of the particle size, i.e., radius$\approx r_p^2$, and a similar sorting of nanostructures is possible. Specifically, the force imparted to the nanostructure is about $0.97 I \pi r_p^2$. The nanostructure is essentially transparent to the laser light. The laser beam can be diffuse. In an embodiment, the laser rasterizes the mixtures of nanostructures (e.g., nanotubes) and remnants. The advantage of this method is that it is pressure and flow independent. The use of a laser can be done in conjunction with the gas flow technique. The wavelength of the laser beam is selected such that it does not discharge the particles in the dusty plasma. It is foreseen that even if the laser beam does discharge the particles in the dusty plasma that the particles would quickly charge back due to high electron collision rate in the plasma.

Figure 11:
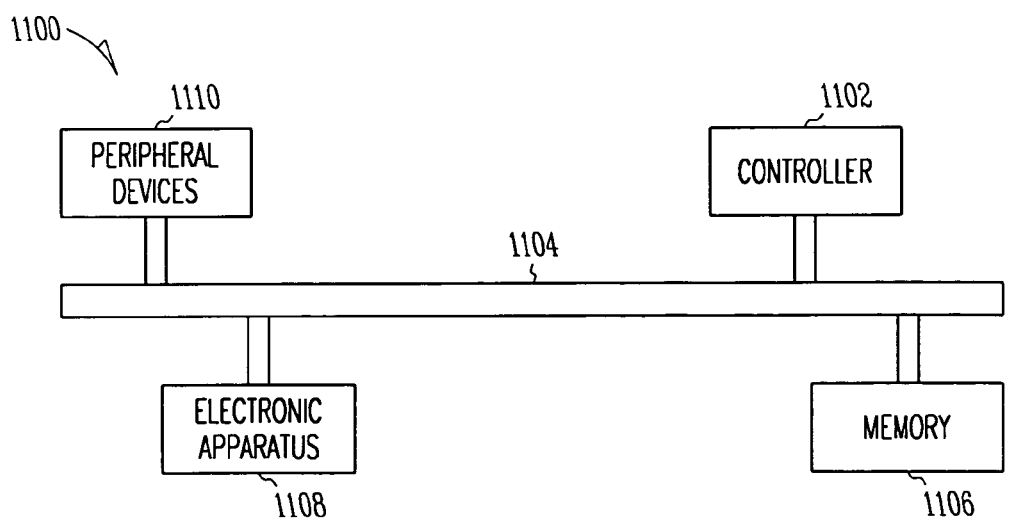
FIG. 11 is a schematic view of a system according to an embodiment of the present invention.

FIG. 11 shows a system 1100 having a controller 1102 and a memory 1106. Controller 1102 and/or memory 1106 includes a nanostructure, such a nanotube, sorted according to the teachings herein. System 1100 also includes an electronic apparatus 1108 and a bus 1104. The bus 1104 provides electrical conductivity and data transmission between controller 1102 and electronic apparatus 1108, and between controller 1102 and memory 1106. Bus 1104 may include an address, a data bus, and a control bus, each independently configured. Bus 1104 also uses common conductive lines for providing address, data, and/or control, the use of which may be regulated by controller 1102. In an embodiment, electronic apparatus 1108 includes additional memory devices configured similarly to memory 1106. An embodiment includes an additional peripheral device or devices 1110 coupled to bus 1104. In an embodiment controller 1102 is a processor. Any of controller 1102, memory 1106, bus 1104, electronic apparatus 1108, and peripheral device or devices 1110 may include a nanostructure, such as a carbon nanotube sorted according to the teachings herein. System 1100 may include, but is not limited to, information handling devices, telecommunication systems, and computers. Peripheral devices 1110 may include displays, additional memory, or other control devices that may operate in conjunction with controller 1102 and/or memory 1106.

CONCLUSION

Nanotubes, in particular carbon nanotubes are fabricated in environments where remnants of materials used to fabricate the nanotubes remain. The nanotubes and remnants tend to stick together. This is one of the drawbacks to the use of nanotubes in commercial applications. Another drawback is the nonuniform length of nanotubes. Accordingly, there is a desire to sort and clean the nanotubes. The techniques described herein achieve these goals, as well as others that would be apparent to those of skill in the art. Generally, the present technique relies on the principle that like charged particles will repel each other and separate. A motive force is added to move the separated nanotubes and remnants. This motion will sort the nanotubes. The present technique is generally described for use with nanotubes but is also applicable to other nanostructures, such as nano-dots, nano-crystals, and nano-balls, etc. be used with the teachings herein.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

All publications, patents, and patent documents are incorporated by reference herein, as though individually incorporated by reference.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

What is claimed is:

1. A method, comprising:
   providing a bundle of nanotubes;
   suspending the nanotubes in a plasma to provide plasma-suspended nanotubes; and
   sorting the plasma-suspended nanotubes according to size and separating the plasma-suspended nanotubes from remnant material using a motive force.

2. The method of claim 1, wherein providing the bundle of nanotubes includes providing a plurality of single walled carbon nanotubes.

3. The method of claim 2, wherein suspending the nanotubes includes creating the plasma around the bundle of nanotubes that includes the remnant material from fabrication of the bundle of nanotubes.

4. The method of claim 3, wherein sorting the plasma-suspended nanotubes includes applying a gas flow to the plasma-suspended nanotubes.

5. The method of claim 3, wherein sorting the plasma-suspended nanotubes includes lazing the plasma-suspended nanotubes.

6. The method of claim 3, wherein creating the plasma includes creating a dirty plasma that separates the nanotubes from each other and other remnant material.

7. The method of claim 6, wherein the remnant material includes a carbonaceous particulate.

8. The method of claim 3, wherein sorting the plasma-suspended nanotubes includes sorting the plasma-suspended nanotubes into groups, wherein the plasma-suspended nanotubes have essentially the same length within each of the groups.

9. The method of claim 1, wherein providing the bundle of nanotubes includes subjecting the bundle of nanotubes to filtration, chromatography, and centrifugation of sonicated solutions of the raw fabrication material.

10. A method, comprising:
    fabricating a bundle of nanotubes using an electric arc technique;
    suspending the nanotubes in a plasma to provided plasma-suspended nanotubes; and
    sorting the plasma-suspended nanotubes according to size and separating the plasma-suspended nanotubes from remnant material resulting from the fabricating.

11. The method of claim 10, wherein fabricating using an electric arc technique includes providing two carbon rod electrodes placed end to end and spaced apart.

12. The method of claim 11, wherein fabricating the bundle of nanotubes includes filling a chamber with an inert gas in which the carbon rod electrodes are placed.

13. The method of claim 12, wherein filling the chamber includes filling the chamber with at least one of argon and helium.

14. The method of claim 12, wherein fabricating the bundle of nanotubes includes reducing the pressure in the chamber to a range between about 50 and 700 mbar.

15. The method of claim 11, wherein fabricating the bundle of nanotubes includes injecting a direct current of about 50 to 100 amps, driven by approximately 20 volts, to create a high temperature discharge between the two carbon rod electrodes.

16. The method of claim 10, wherein fabricating the bundle of nanotubes includes fabricating a plurality of single walled carbon nanotubes.

17. The method of claim 10, wherein suspending the nanotubes includes creating the plasma around the bundle of nanotubes that includes the nanotubes and the remnant material from fabrication of the nanotubes.

18. The method of claim 17, wherein creating the plasma includes creating a dirty plasma that separates the nanotubes from each other and other remnant material.

19. The method of claim 18, wherein the remnant material includes a carbonaceous particulate.

20. The method of claim 10, wherein sorting the plasma-suspended nanotubes includes applying a gas flow to the plasma-suspended nanotubes.

21. The method of claim 10, wherein sorting the plasma-suspended nanotubes includes lazing the plasma-suspended nanotubes.

22. An integrated circuit fabrication method, comprising:
providing a bundle of nanotubes;
suspending the nanotubes in a plasma to provide plasma-suspended nanotubes;
sorting the plasma-suspended nanotubes according to size and separating the plasma-suspended nanotubes from remnant material to keep a usable batch of nanotubes; and
applying the usable batch of nanotubes to an integrated circuit.

23. The method of claim 22, wherein applying the usable batch of nanotubes includes fabricating electrical conductors using the nanotubes.

24. The method of claim 22, wherein applying the usable batch of nanotubes includes fabricating transistors using the nanotubes.

25. The method of claim 24, wherein applying the usable batch of nanotubes includes fabricating memory devices using the nanotubes.

* * * * *